UNITED STATES PATENT OFFICE.

MARK W. MARSDEN, OF PHILADELPHIA, PENNSYLVANIA.

TREATMENT OF RICE-STRAW FOR RECOVERY OF ITS VALUES.

1,313,403.     Specification of Letters Patent.     Patented Aug. 19, 1919.

No Drawing.     Application filed October 28, 1916. Serial No. 128,233.

*To all whom it may concern:*

Be it known that I, MARK W. MARSDEN, a citizen of the United States, residing at Philadelphia, in the county of Philadelphia and State of Pennsylvania, have invented certain new and useful Improvements in the Treatment of Rice-Straw for Recovery of Its Values, of which the following is a specification.

This invention relates to a method of treating rice straw for the recovery of its values.

Rice straw is practically a waste material and is frequently disposed of by burning. To a small extent it is employed for packing and crating, and some effort has been made to utilize it as a cattle food, but it is unsuitable for this purpose unless combined with other and more palatable and nutritive food constituents. It has also been proposed to utilize the fiber for paper making, but the treatments were too harsh and nothing practicable was accomplished in this direction.

Rice straw is too valuable to be employed solely for the purposes aforementioned, including paper making. The available fiber amounts to from thirty to forty-two per cent. Hence with the old methods of fiber liberation there is a loss of from sixty to seventy per cent.

The object of my invention is to recover all of the available fiber in all of its inherent strength and to recover the by-products that heretofore have been lost in the recovery of the fiber.

In practising the invention I first subject the straw to a steaming process until it is completely saturated with hot moisture and rendered soft and pliant. While in this condition I run it through a shredding machine so as to reduce it to an uniformly divided fibrous mass. The first step is very important because it obviates splitting and loss of materials during the mechanical disintegration. The shredded stock is then subjected to the leaching action of steam and water in order to remove the coloring matter, silica, and other solubles. The leaching is continued until the liquor shows a density of from twelve to twenty degrees Baumé, more or less, according to the nature of the material undergoing treatment. The liquor is then drawn off for recovery, and the fibrous stock is washed and then passed through a refining engine. The resultant pulp is useful in the manufacture of cardboard when combined with the usual filling and sizing materials.

By continuing the process from the refining engine to a closed digestor wherein I can have a steam pressure of from seventy to one hundred pounds, or more, and by the addition of an alkali or sulfid solution, I am enabled to produce an admirable paper making pulp which may readily be reduced in the ordinary beater. By my method of treatment less than half the quantity of alkali or other reducing agent heretofore employed is required so that overcooking and other destructive influences are completely obviated, and the paper of the process is characterized by its inherent strength, toughness and durability. Evidently bleaching, sizing, coloring, etc., may be resorted to if necessary or desirable.

The extractive or leaching liquor is preferably treated with a solution of carbonate of lime to remove any acidity and then a ferment is introduced so that at the proper stage alcohol may be recovered, as well as coloring matter and other by-products, including the residue of the treatment, which constitutes an elegant fertilizing medium.

Having described the nature and object of the invention, I claim:—

The method of treating rice straw for the recovery of its values, comprising the following steps, first, subjecting the straw to a preliminary steaming until it is fully saturated with hot moisture whereby it is rendered soft and pliant, second, shredding it while so conditioned, third, subjecting the shredded stock to the leaching action of steam and water in order to remove the coloring matter, silica and other solubles and continuing this treatment until the liquor has a density of from twelve to twenty degrees Baumé, fourth, drawing off the leaching liquor and treating it with carbonate of lime preliminary to the recovery of the products of the leaching treatment, fifth, washing and refining the fiber, substantially as described.

In testimony whereof I affix my signature in the presence of two witnesses.

MARK W. MARSDEN.

Witnesses:
   ALLAN I. HUCKINS,
   E. W. STRAIN.